(12) United States Patent
Biswas

(10) Patent No.: US 8,996,718 B2
(45) Date of Patent: Mar. 31, 2015

(54) TCP-AWARE RECEIVE SIDE COALESCING

(75) Inventor: Anumita Biswas, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 13/364,585

(22) Filed: Feb. 2, 2012

(65) Prior Publication Data

US 2013/0205037 A1 Aug. 8, 2013

(51) Int. Cl.
*G06F 15/16* (2006.01)
*H04L 12/805* (2013.01)
*H04L 12/841* (2013.01)

(52) U.S. Cl.
CPC .............. *H04L 47/365* (2013.01); *H04L 47/28* (2013.01)
USPC ....................................................... 709/232

(58) Field of Classification Search
CPC ...... H04L 47/365; H04L 47/193; H04L 47/28
USPC .......... 709/230–235, 245–247; 370/229–235, 370/389–394, 395.5–395.52, 469–477
See application file for complete search history.

(56) References Cited

U.S. PATENT DOCUMENTS

| 6,038,651 | A | * | 3/2000 | VanHuben et al. | 712/21 |
| 6,487,211 | B1 | * | 11/2002 | Yamaguchi | 370/412 |
| 6,633,566 | B1 | * | 10/2003 | Pierson, Jr. | 370/395.1 |
| 7,987,307 | B2 | | 7/2011 | Sarangam et al. | |
| 8,036,246 | B2 | | 10/2011 | Makineni et al. | |
| 8,306,062 | B1 | * | 11/2012 | Cohen | 370/473 |
| 2006/0104303 | A1 | * | 5/2006 | Makineni et al. | 370/463 |
| 2007/0022212 | A1 | * | 1/2007 | Fan | 709/238 |
| 2007/0064737 | A1 | | 3/2007 | Williams | |
| 2009/0232137 | A1 | * | 9/2009 | Cherian et al. | 370/392 |
| 2009/0323690 | A1 | * | 12/2009 | Lu et al. | 370/392 |
| 2010/0174824 | A1 | * | 7/2010 | Aloni et al. | 709/230 |
| 2010/0198984 | A1 | * | 8/2010 | Aloni et al. | 709/234 |
| 2010/0260186 | A1 | * | 10/2010 | Hua et al. | 370/394 |

OTHER PUBLICATIONS

Liao (Liao G., A New Server I/O Architecture for High Speed Networks, 2011, University of California Riverside Intel Labs, IEEE, p. 255-265).*
Kumar (Kumar A., Characterization of Direct Cache Access on Multi-core Systems and 10GbE, 2008, Intel Corporation, IEEE, p. 341-351).*
Govindarajan et al. (Govindarajan P., Achieving 10Gbps Network Processing: Are We There Yet?, 2011, Intel Corporation, p. 518-528).*

(Continued)

*Primary Examiner* — Brian J Gillis
*Assistant Examiner* — Michael A Keller
(74) *Attorney, Agent, or Firm* — Fish & Richardson P.C.

(57) ABSTRACT

In response to a transport control protocol (TCP) packet received from an Internet protocol (IP) layer of a TCP/IP stack of a data processing system, a large receive offload (LRO) layer of the TCP/IP stack is to identify a flow associated with the TCP packet, to determine whether the identified flow should be coalesced based on a set of one or more rules, to coalesce the TCP packet into a pending coalesced TCP packet without immediately sending the TCP packet to a TCP layer of the TCP/IP stack, if it is determined that the identified flow should be coalesced based on the set of one or more rules, and otherwise to immediately send the TCP packet to the TCP layer for TCP processing.

24 Claims, 10 Drawing Sheets

(56) References Cited

OTHER PUBLICATIONS

Liao (Liao, Guangdeng, Accelerating I/O Processing in Server Architectures, 2011, University of California Riverside, UC Riverside Electronic Theses and Dissertations, Ph.D. Computer Science UC Riverside, pp. at least 8, 15-17, 23-24, 40, 67-79).*

Menon, Aravind et al., "Optimizing TCP Receive Performance," USENIX Association, USENIX '08, 2008 USENIX Annual Technical Conference, Boston, Massachusetts, USA, Jun. 22-28, 2008, 14 pages.

Makineni, Srihara et al., "Receive Side Coalescing for Accelerating TCP/IP Processing," High Performance Computing, HiPC2006, Lecture Notes in Computer Science, 2006, vol. 4297/2006, pp. 289-300.

Zec, Marko et al., "Estimating the Impact of Interrupt Coalescing Delays on Steady State TCP Throughput," in Proceedings of the $10^{th}$ SoftCOM 2002 conference, 6 pages.

* cited by examiner

TCP-AWARE RECEIVE SIDE COALESCING

FIELD OF THE INVENTION

Embodiments of the present invention relate generally to network packet processing. More particularly, embodiments of the invention relate to TCP receive side coalescing.

BACKGROUND

Ever increasing bandwidth needs of enterprise data centers has led to the development of 10 Gbps Ethernet technology. Commercial 10 Gbps Ethernet Network Interface Cards (NICs) have been available in the market for some time now. TCP/IP is the most commonly used protocol to process data both in enterprise data centers and on the Internet. Recently, a technique, referred to as receive as side coalescing (RSC) or large receive offload (LRO), has been introduced to increase transport control protocol/Internet protocol (TCP/IP) processing. RSC allows NICs to identify packets that belong to the same TCP/IP flow and to coalesce them into a single large packet. As a result, a TCP/IP stack has to process fewer packets reducing per packet processing costs. A NIC can do this coalescing of packets during interrupt moderation time, and hence packet latency is not affected.

Typically, the RSC is implemented within NIC hardware or in a lower level of a network stack that is lower than a TCP/IP stack. As packets are pulled from the driver's receive queue, they are run through the LRO code that parses the packet contents to determine whether the packet can be coalesced or not. At this point, the LRO code has no knowledge of the state maintained by a TCP layer for the connection and the TCP layer has no knowledge that it is actually receiving a large coalesced packet. In addition, typically only those packets that arrived in a burst (e.g., driver implements interrupt coalescing also) and are already present in the driver's receive queue are coalesced into a large frame.

Such a technique performs poorly or has limitations in the certain situations. When the remote peer's throughput is inhibited by the receiver's reduced ACK responses, since a TCP layer sees only a coalesced packet (instead of the actual number of segments sent by the sender), it sends at most one acknowledge (ACK) message. If a Delayed ACK option is enabled, it may send at most one ACK for two large coalesced packets. The sender's congestion window, or ability to transfer more data in a given round trip time depends largely on how frequently it receives the ACKs. If the acknowledgements are slow in arriving, this may inhibit the throughput of the sender and has a counter effect on a single connection's throughput.

Further, consider a TCP connection reaching steady state transferring bulk data, at some point, some element in the network drops a packet of the connection but continues to send further packets in the stream. For every out of order packet received, the receiver sends a Duplicate ACK. When the TCP sender receives three Duplicate ACKs, it retransmits the lost packet immediately without resorting to a retransmit timeout. A retransmit timeout is usually of the order of half a second or more and results in severe reduction in network utilization. So the TCP protocol makes several improvements to loss recovery as part of its Fast Retransmit and Fast Recovery algorithms. With current LRO, when TCP receives one large out of order coalesced packet, it generates only one Duplicate ACK, and the other end is unable to follow the Fast Retransmit and Recovery algorithm. Hence connections with loss and LRO end up with Retransmit Timeouts and a longer recovery period than without LRO.

If the LRO logic is implemented at a low level then separate changes are required to parse different forms of Layer-2 headers. This becomes complicated for some applications where TCP/IP packets may be transmitted over a plethora of media including non-traditional networks such as universal serial bus (USB) and Firewire, some of whose specifications may not be known at the time of implementing the LRO logic.

When a device acts as a bridge or router, it forwards TCP packets from ingress interface to egress interface based on routing tables or other logic. If LRO is blindly done on the receive side, then the large packet once again needs to be broken down into network sized units before sending them on the egress interface. So additional processing is then required to make sure that packets intended to be bridged or routed do not go through the LRO path unless the outgoing interface hardware support TCP segmentation offload. Finally, if the software LRO code is too low in the network stack, only the coalesced packet is passed through firewall rules. There may be cases where firewall rules are to be applied to individual packets.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention.

The appearances of the phrase "in one embodiment" in various places in the specification do not necessarily all refer to the same embodiment.

According to some embodiments, LRO logic is implemented as a semi-layer between an IP layer and a TCP layer of a TCP/IO stack, referred to herein as an LRO layer. After the IP processing is completed by an IP layer and before the TCP packet is handed to a TCP layer, in one embodiment, the LRO layer is to determine whether the incoming TCP packet is suitable for packet coalescing, for example, based on a set of rules or policies. If the LRO layer determines that the incoming TCP packet should be coalesced, the TCP packet is placed in a queue maintained by the LRO layer and the TCP packet is not handed to the TCP layer immediately. If the LRO layer determines that the TCP packet should not be coalesced, the LRO layer immediately sends the TCP packet to the TCP layer for TCP processing. In one embodiment, a two-way communications path is maintained between the LRO layer and the TCP layer to allow the TCP layer to provide instructions and/or feedbacks to the LRO layer whether packets of a particular connection should be coalesced and when to start, stop or suspend, and restart the TCP coalescing. In such a configuration, the TCP layer is in the best position to decide when and/or how to perform the TCP RSC processing.

Figure 1:
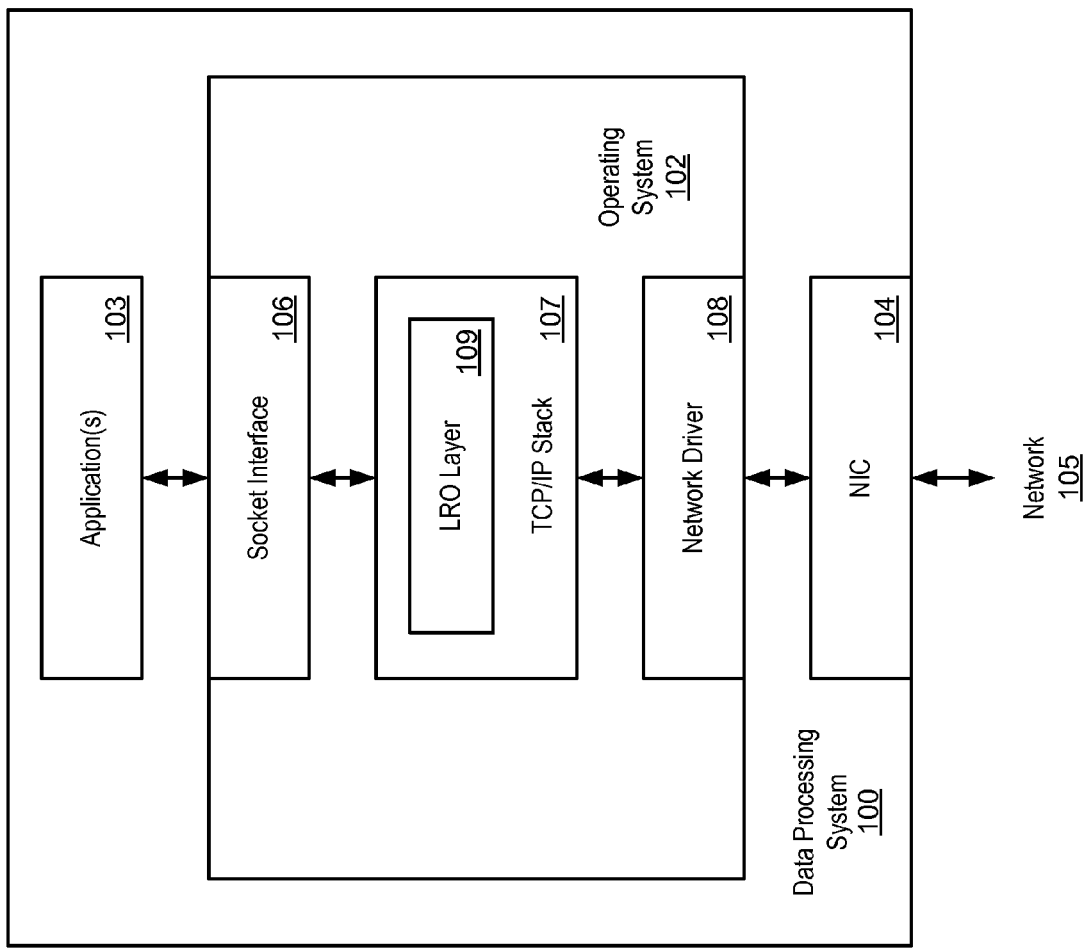
FIG. 1 is a block diagram illustrating a system having a TCP/IP stack having LRO logic according to one embodiment of the invention.

FIG. 1 is a block diagram illustrating a system having a TCP/IP stack having LRO logic according to one embodiment of the invention. System 100 can represent any of the data processing systems, such as a desktop, a laptop, a tablet, a client device, a server device, a router, an access point, a mobile phone, a gaming device, a media player, a settop box, or any other devices capable of communicating in a network. Referring to FIG. 1, system 100 includes, but is not limited to, operating system 102 executed by a processor (not shown) of data processing system 100, where operating system 102 includes a network stack having a TCP/IP stack 107 and network driver 108 to allow applications 103 to access network 105 via socket interface 106 and hardware NIC 104.

Operating system 102 can be any kind of operating systems, such as Mac OS™ or iOS™ from Apple Inc. of Cupertino, Calif., Windows™ operating system from Microsoft of Redmond, Wash., LINUX, UNIX, or other real-time or embedded operating systems. Network 105 may be a local area network (LAN), a wide area network (WAN), or a combination thereof, wired or wireless. According to one embodiment, TCP/IP stack 107 includes LRO layer 109 to perform RSC processing on the incoming packets received from network driver 108 to accelerate TCP processing.

Figure 2:
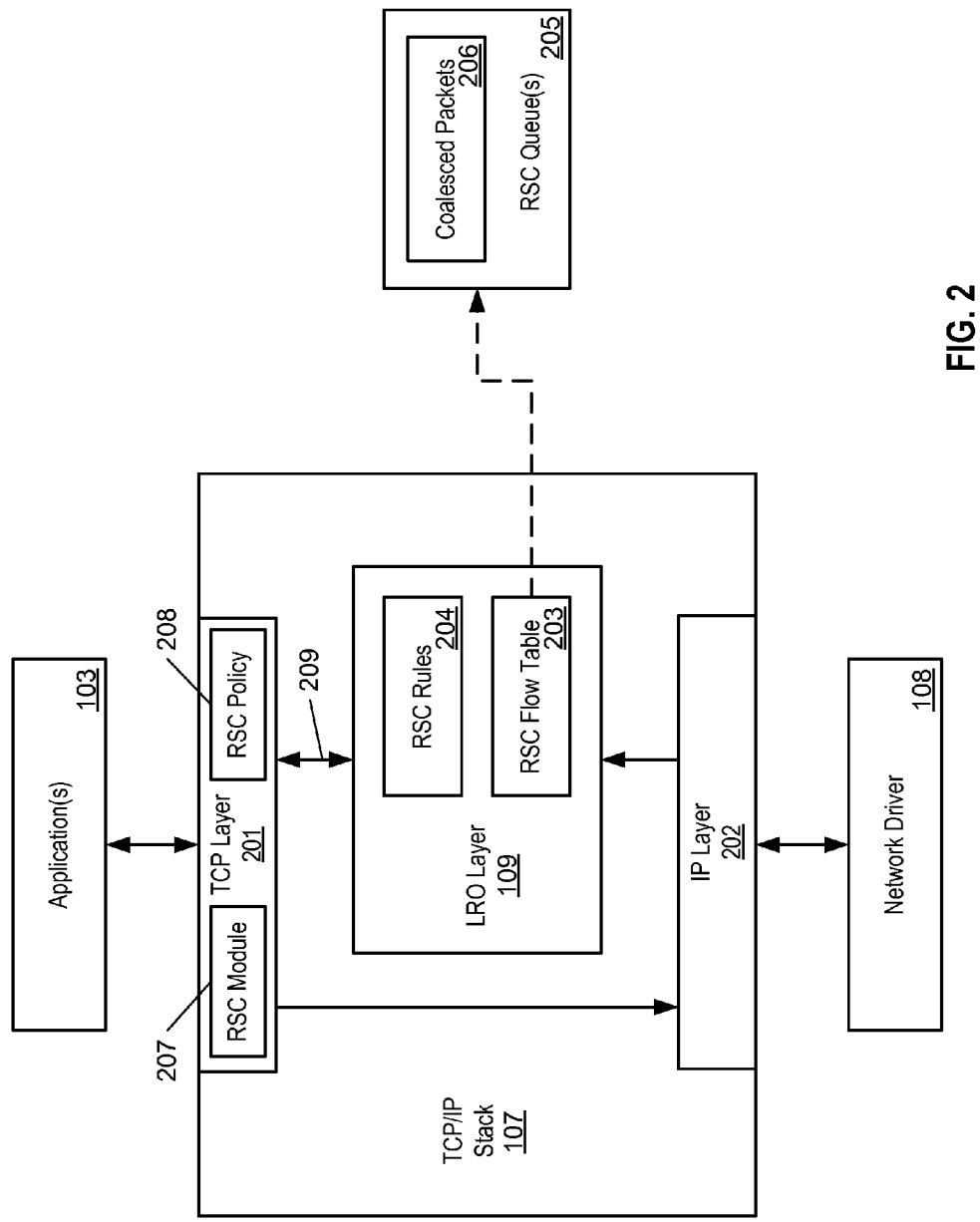
FIG. 2 is a block diagram illustrating an example of a TCP/IP stack according to one embodiment of the invention.

FIG. 2 is a block diagram illustrating an example of a TCP/IP stack according to one embodiment of the invention. Referring to FIG. 2, TCP/IP stack 107 includes TCP layer 201, IP layer 202, and LRO layer 109, which is located between TCP layer 201 and IP layer 202. In one embodiment, LRO layer 109 performs TCP coalescing on the TCP packets received from IP layer 202 based on a set of RSC rules 204 and generates coalesced packets 206 stored in RSC queues 205. RSC queues 205 may be maintained within LRO layer 109, within TCP/IP stack 107, or some other memory locations accessible by LRO layer 109. For each flow that is being coalesced by LRO layer 109, flow information is stored in RSC flow table including certain TCP information.

In one embodiment, when LRO layer 109 receives a TCP packet from IO layer 202 after the IP layer has completed all of the IP processing on the packet, LRO layer 109 identifies a flow associated with the incoming packet. In one embodiment, LRO layer 109 identifies the flow associated with the incoming packet based on TCP/IP header information of the packet, such as, for example, source IP address/port and destination IP address/port. LRO layer 109 determines whether the identified flow should be coalesced based on RSC rules 204 and/or RSC flow table 203. In one embodiment, LRO layer 109 looks up in RSC flow table 203 to determine whether RSC flow table 203 contains an entry corresponding to the flow of the incoming packet. An existing flow entry indicates that the flow associated with the incoming packet should be coalesced. If it is determined that the identified flow should be coalesced, instead of immediately sending the packet up to TCP layer 201, LRO layer 109 coalesces the TCP packet into a coalesced packet and stored in RSC queue 205 as part of coalesced packets 206. Otherwise, if it is determined that the incoming TCP packet should not be coalesced, LRO layer 109 immediately sends the packet up to TCP layer 201 for TCP processing. When a predetermined condition has been satisfied and/or a predetermined event occurs subsequently, LRO layer 109 then delivers coalesced packets 206 to TCP layer 201.

Figure 3:
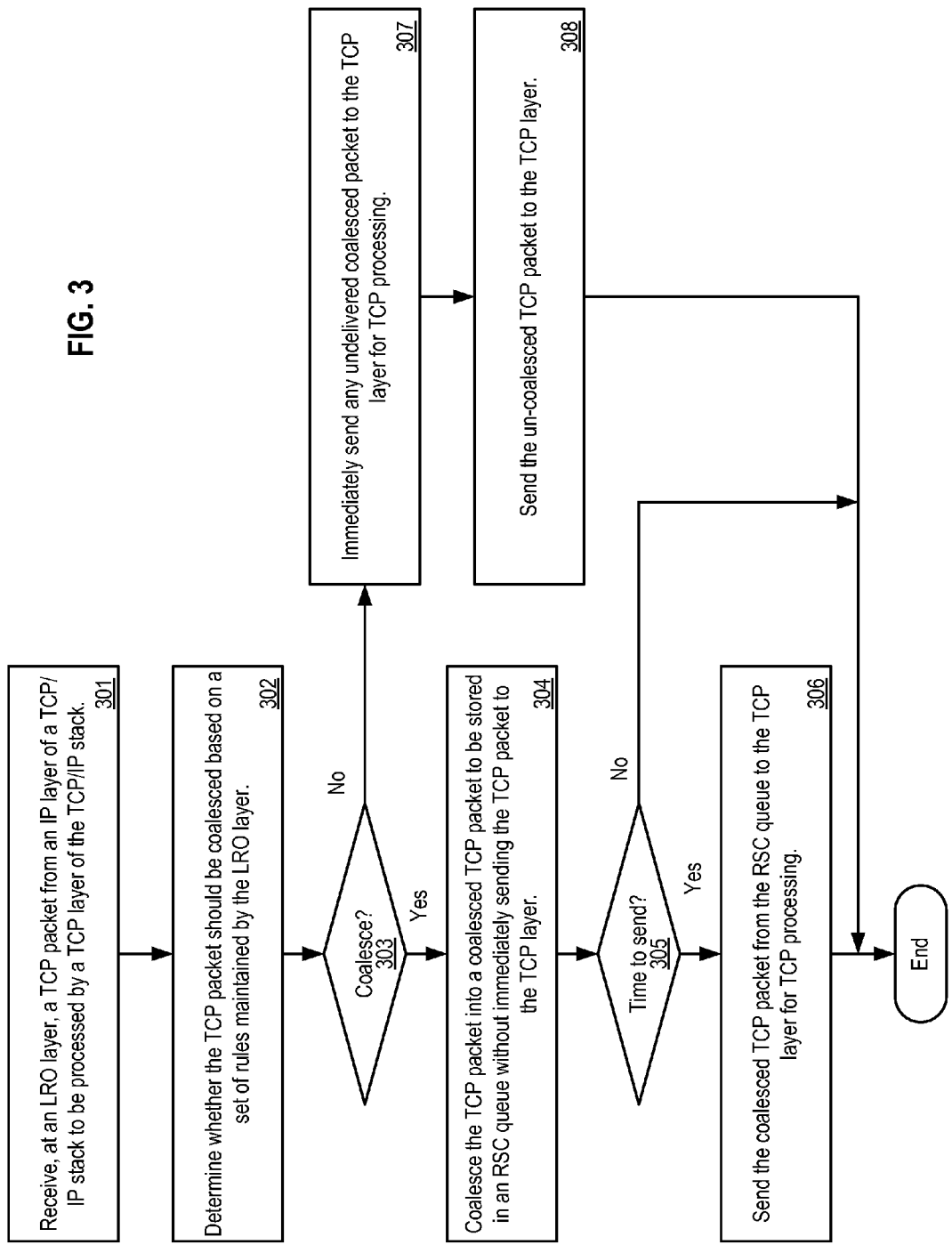
FIG. 3 is a flow diagram illustrating a method of TCP coalescing according to one embodiment of the invention.

FIG. 3 is a flow diagram illustrating a method of TCP coalescing according to one embodiment of the invention. Method 300 may be performed by LRO layer 109 of FIG. 2. Referring to FIG. 3, at block 301, a LRO layer receives a TCP packet from an IP payer of a TCP/IP stack after the IP layer has completed the IP processing, such as, stripping off the IP header to reveal the TCP packet. At block 302, the LRO layer determines whether the TCP packet should be coalesced based on a set of rules maintained by the LRO layer. For example, the LRO layer may identify a flow associated with the packet and determine whether the flow has been configured to be coalesced and stored in an RSC flow table, which will be described in details further below. If it is determined at block 303 that the packet should be coalesced, the LRO layer coalesces the packet into a currently pending or a new coalesced packet and stores or updates the coalesced packet in an RSC queue that is associated with a flow of the incoming packet. That is, the incoming packet is coalesced by the LRO layer without immediately being sent up to a TCP layer of the TCP/IP stack.

At block 305, the LRO layer or another maintenance thread determines whether it is time to send the currently pending coalesced packet to the TCP layer based on one or more conditions associated with the flow. For example, if a number of packets currently coalesced in the pending coalesced packet exceeds a predetermined threshold (e.g., eight), the pending coalesced packet may be delivered to the TCP layer at block 306. Alternatively, if a request is received from the TCP layer requesting to stop or suspend the TCP coalescing (e.g., the sender is idle for a while), the LRO layer will also deliver the pending coalesced packet to the TCP layer. Other scenarios may also trigger the delivery of the coalesced packets. If it is determined at block 303 that the incoming packet should not be coalesced, any pending coalesced packets in the RSC queue of the flow are delivered to the TCP layer and thereafter at block 308, the incoming packet is immediately sent up to the TCP layer at block 307 after delivering any pending coalesced packets in the RSC queue of the flow.

Referring back to FIG. 2, as described above, there is a two-way communications path 209 between LRO layer 109 and TCP layer 201. In one embodiment, TCP layer 201 can instruct via path 209 LRO layer 109 to start and/or stop TCP coalescing based on RSC policy 208, which may be configured by a software developer, a network administrator, or an end user, etc. Specifically, according to one embodiment, when LRO layer 109 receives a TCP packet from IP layer 202, LRO layer 109 may validate the TCP checksum in the packet. If the checksum validation fails, LRO layer 109 may drop the packet. If the checksum has been validated, LRO layer 109 looks up in RSC flow table 203 associated with a flow of the incoming packet. In one embodiment, RSC flow table 203 includes multiple entries, each corresponding to a flow that is currently being coalesced. Each entry in this table contains states about a TCP connection that has been established and blessed by TCP as being one that may be passed through LRO layer 109. If an entry associated with the flow does not exist, LRO layer 109 stops processing the packet and hands the packet over to TCP layer 201.

TCP layer 201 processes the packet as usual. Additionally TCP layer 201 employs certain heuristics and checks, which may be configured as part of RSC policy 208, in order to set up LRO layer 109 for coalescing future packets for the same connection. In one embodiment, if the packet is associated with a multimedia streaming application such as video, or a bulk data transfer application (identified by the traffic class the application's socket belongs to, such as socket interface 106), subsequent packets may be coalesced. Alternatively, if there is at least a certain amount (e.g., predetermined threshold) of data packets have already been received on the connection without being idle, subsequent packets may be coalesced. Further, if the incoming packet is another data packet that is in-sequence (e.g., not an order-of-order packet), subsequent packets may be coalesced. Other conditions may also be configured as part of RSC policy 208. If one or more conditions are met, then TCP layer 201 instructs LRO layer 109 to create or allocate an entry in RSC flow table 203 and to store certain information such as the next expected sequence number in the entry to the byte number it expects to receive exactly after the last byte of the current packet processed. LRO layer 109 may use such information to decide whether to start or stop coalescing the stream.

If there is an existing entry in RSC flow table 203, according to one embodiment, LRO layer 109 performs certain sanity checks, such as whether a certain control flag other than an ACK flag is set on the packet. In one embodiment, any TCP flag related to SYN, FIN, RST, ECE, or PSH may signal LRO layer 109 to immediately hand over the packet to TCP layer 201 without coalescing. If all sanity checks pass, LRO layer 109 stores the packet as part of coalesced packets 206 in RSC queue 205 associated with that flow table entry if the packets TCP sequence number is equal to the next expected sequence number in the flow table. If this is the first packet being added to a flow table entry, according to one embodiment, LRO layer 109 starts a timer to be fired after a predetermined period of time (e.g., 10 milliseconds) to ensure that the packet does not stay in RSC queue 205 too long if no further packet arrives on that connection. If the timer fires, all packets queued up for any flow table entry at the time of servicing the timer are handed up to TCP layer 201.

If LRO layer 109 finds an existing entry in flow table 203, according to one embodiment, LRO layer 109 coalesces the packet by stripping off the TCP headers in the incoming packet and combines the payload with the existing or pending coalesced packet (via linking without data copy). LRO layer 109 updates the TCP length and timestamp information in the coalesced packet. For all subsequent in-sequence packets, the same process may be repeated. That is, the TCP header is stripped, data added to the coalesced packet, and the TCP header of the original entry in the flow table updated to reflect the longer length. Once a number of packets coalesced exceeds a predetermined threshold (e.g. eight), LRO layer 109 updates the next expected sequence number in the flow table and sends up the coalesced TCP packet to TCP layer 201. LRO layer 109 may also specify in the coalesced packet to indicate to TCP layer 201 that it is a coalesced packet having multiple original TCP packets coalesced therein.

When TCP layer 201 receives the coalesced TCP packet, according to one embodiment, it processes the coalesced packet as usual. This is where TCP processing is cut down due to LRO layer 109. Also a number of wakeups sent to the upper layer application 103 is cut down as many times as the number of data packets coalesced. RSC module 207 of TCP layer 201 also notes that multiple ACKs need to be sent in response to this coalesced packet instead of just one ACK. In one embodiment, TCP ACKing is altered to send one ACK for every two packets coalesced. When TCP stretch ACKing is enabled, TCP ACKing is altered to send one ACK for every eight packets coalesced. The processing here is also compressed so that TCP layer 201 forms only one ACK packet for the large coalesced packet and then RSC module 207 outputs copies over the ACK to as many ACKs as necessary and only alters the ACK number in each of the outgoing ACKs.

According to one embodiment, whenever LRO layer 109 receives a data packet whose sequence number is not equal to the next expected sequence number (e.g., out-of-order packet), LRO layer 109 immediately ejects the coalesced packet in its queue (if any) and hands it up to TCP layer 201. Right after that LRO layer 109 hands over the out-of-order packet just received to TCP layer 201. TCP layer 201 processes the in-order coalesced packet as usual. But when TCP layer 201 encounters the out-of-order packet, TCP layer 201 does a little extra work to remove the corresponding flow table entry from RSC flow table 203. In this embodiment, TCP layer 201 is able access RSC flow table 203 to manipulate the information stored therein. In such a configuration, RSC flow table may be maintained by TCP/IP stack 107 and shared by LRO layer 109 and TCP layer 201. Alternatively, TCP layer 201 can sends a request, for example, via an application programming interface (API), to LRO layer 109 instructing the LRO layer 109 to remove the entry. As a result, any subsequent out-of-order packets are not coalesced by LRO layer 109 and immediately handed over to TCP layer 201. RSC module 207 of TCP layer 201 then is in a position to send as many duplicated ACKs as necessary to kick off the fast retransmit and recovery algorithm.

In this embodiment, TCP layer 201 is to communicate with LRO layer 109 and pick and choose which sockets to turn on RSC, avoiding interactive, low latency applications. The feedback loop 209 from TCP layer 201 down to LRO layer 109 and back up to TCP layer 201 enables the implementation of a robust LRO implementation that can work as good as traditional TCP in lossy environments and work without regression for a diverse class of network applications with low latency demands to high bandwidth demands. All these are performed while enabling streaming applications to perform better on low-end devices with low CPU bandwidth by shrinking CPU utilization.

Figure 4:
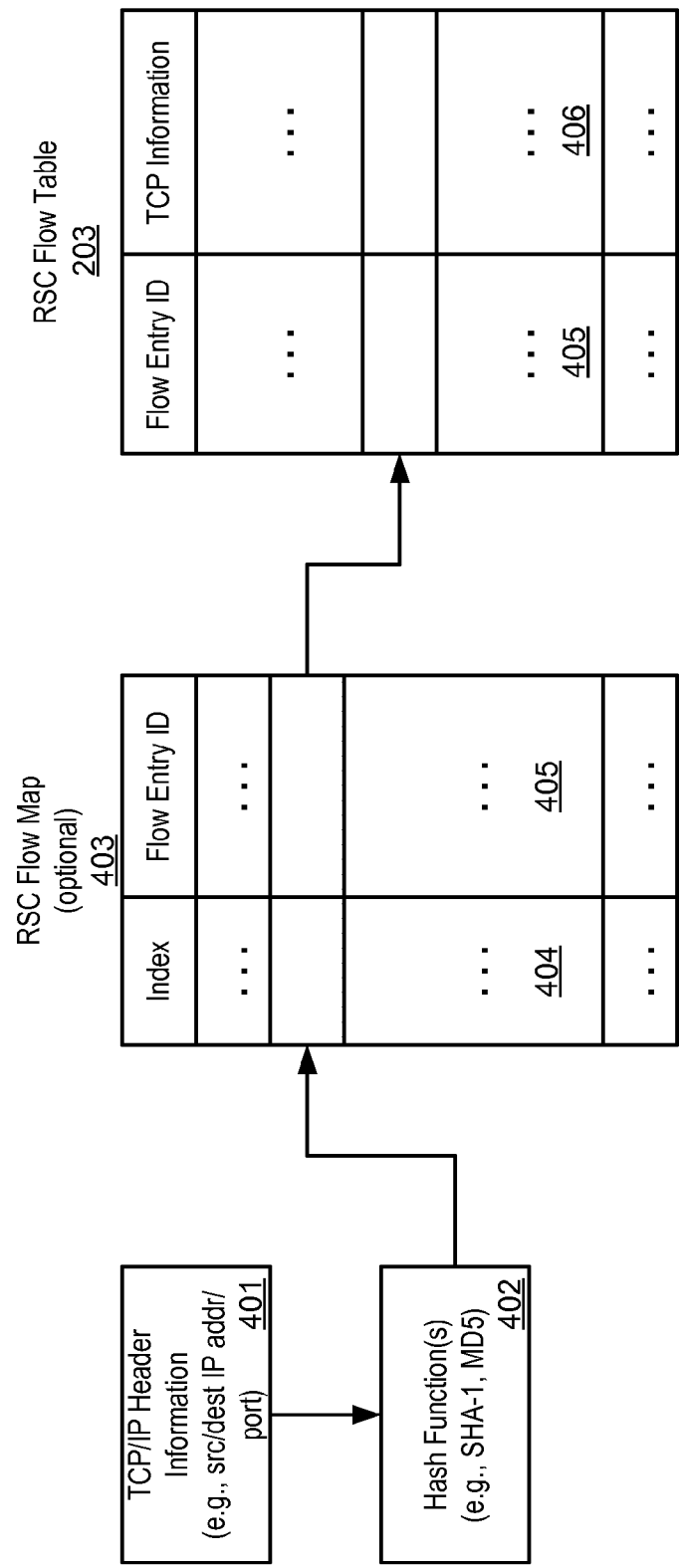
FIG. 4 is a block diagram illustrating examples of data structures used in SRC processing according to certain embodiments of the invention.

FIG. 4 is a block diagram illustrating examples of data structures used in RSC processing according to certain embodiments of the invention. The data structures include RSC flow table 203 and an optional RSC flow map 403. In one embodiment, RSC flow table 203 includes multiple entries each corresponding to a flow identified by a flow entry ID 405 and TCP information 406 stored therein. Flow table 203 can be implemented to store as many as flows handled by the TCP/IP stack. In one embodiment, flow table 203 is implemented as a short array of entries, where each entry holds certain TCP information for one TCP connection. The array list may be implemented as short to limit the resources utilized, under the assumption that at any time, there will only be a limited number of host connections doing bulk data transfer. The flow map 403 is used as an optional means to do a fast lookup of a connection for any arriving packet. Each entry of the flow map is an index (e.g., flow entry ID 405) into an LRO flow table entry.

In one embodiment, flow map 403 has 'm' entries and flow table 403 has 'n' entries, where m>n. Flow map 403 is a sparse array while the flow table 203 is a dense array of real data. When a packet arrives, the LRO layer inspects the packet header to determine certain TCP/IP header information 401 of the corresponding connection, such as, for example, a source port, a destination port, a source IP address, and a destination IP address. The LRO layer then computes a hash using hash function 402 on the TCP/IP header information. Using certain bits of the hash such as the lowest 'n' bits (e.g. 12 bits) of the hash as an index into the flow map 403, the LRO layer reads the content of the flow map 403 to determine the index to the flow table 203.

Specifically, according to one embodiment, when the TCP layer instructs the LRO layer to do coalescing for a particular connection, the LRO layer creates a connection entry in the flow table 203. The LRO layer computes a hash of certain TCP/IP header information (e.g., information 401) such as the source port, destination port, source IP address, and destination IP address provided by the TCP layer. At this time, there is no packet being coalesced. From the hash result (via hash function 402), the LRO layer obtains an index into the flow map 403. If the corresponding flow map entry has not been initialized in flow map 403, the LRO layer allocates a free slot from the flow table 203 and stores the index of the allocated flow table entry in the flow map entry of flow map 403 corresponding to the hash result (e.g., field 405). The LRO layer then initializes the allocated entry (e.g., field 406)) in the flow table 203 with certain information, such as the TCP/IP header information (e.g., source/destination addresses/ports), a timestamp of when the flow was initialized, and the next expected sequence number that TCP expects to receive in the byte stream, etc.

If the flow map entry has already been initialized or taken by some other connections (e.g., hash collision), in one embodiment, the LRO layer gives up on adding the new connection to flow table 203 at that time. Eventually, the existing connection will be closed and the new bulk data transfer connection can begin to be offloaded to the LRO layer. In addition, if the flow map entry has not been initialized or taken, but flow table 203 is full, according to one embodiment, an eviction policy can be applied to evict an entry. For example, the oldest connection can be evicted from flow table 203 based on the RSC timestamp stored in flow table 203. In such a configuration, flow table 203 can be maintained in a reasonable size.

Figure 5:
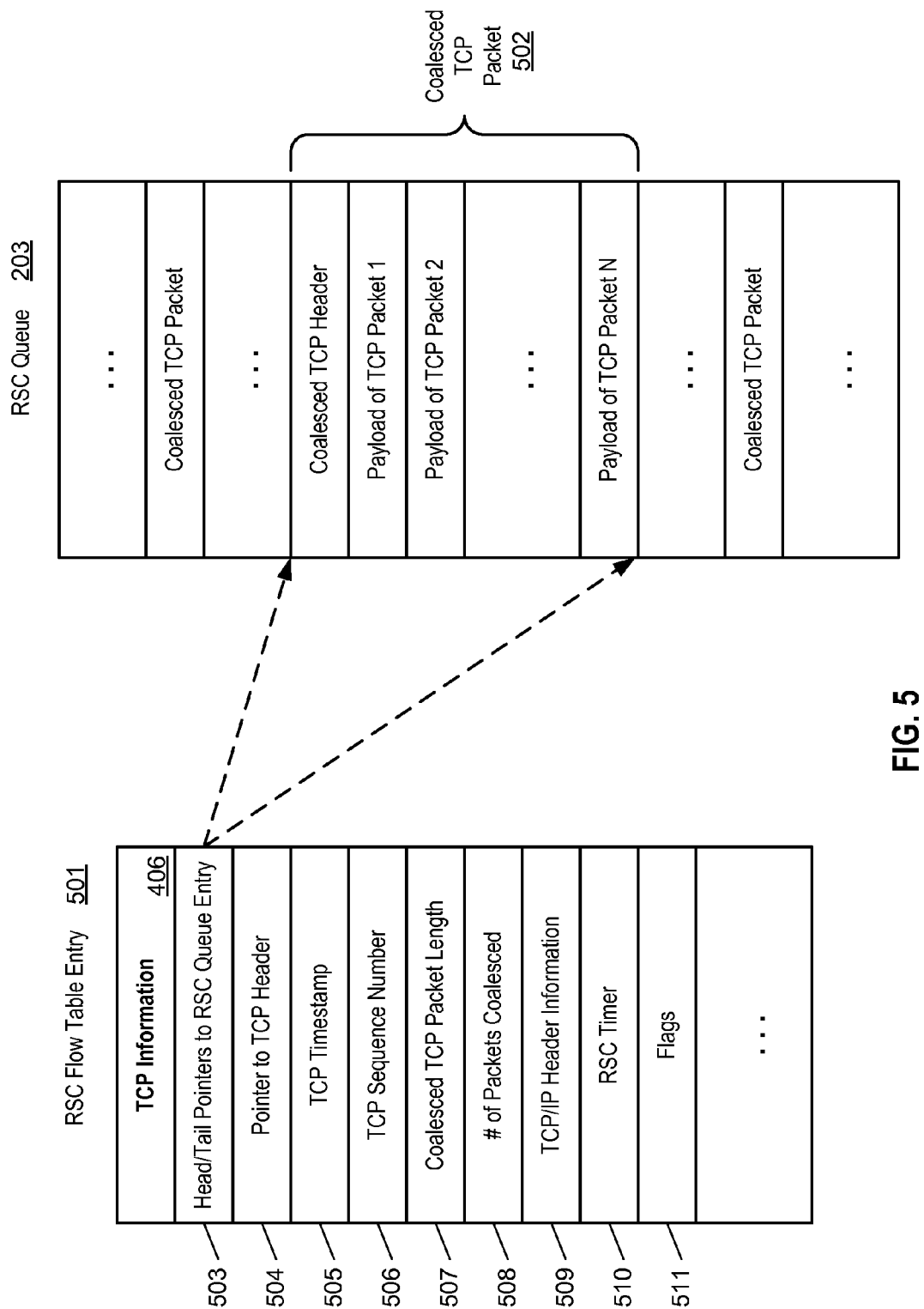
FIG. 5 is a block diagram illustrating an example of a flow table entry according to one embodiment of the invention.

FIG. 5 is a block diagram illustrating an example of a flow table entry according to one embodiment of the invention. Referring to FIG. 5, flow table entry 501 may represent any of the entries in RSC flow table 203. In one embodiment, flow table entry 501 includes head and tail pointers 503 of the packet queue storing coalesced packet 502, pointer 504 to the TCP header of the first packet added to the packet queue, TCP timestamp value and/or TCP timestamp echo reply value 505, TCP sequence number 506, TCP packet length 507, TCP/IP header information 508 (e.g., source port, destination port, source address, and destination address), timestamp of when the flow was created 509, flags 510 to indicate whether TCP has requested to eject a request, and other information.

Before an entry is created in the flow table, the LRO layer passes up the un-coalesced packets to the TCP layer. The TCP processing occurs as normal until a connection is established and at least certain amount (e.g., eight) in-sequence data packets are received by the TCP layer without the connection falling into an idle state in between those data packets. In one embodiment, once the following conditions are met: a) the packet is for a multimedia streaming application like video, or a bulk data transfer application (identified by the traffic class the application's socket belongs to); b) at least a certain amount of data packets have already been received on the connection without being idle; and c) the incoming packet is another data packet that is in-sequence, the TCP layer instructs the LRO layer to create an entry in its flow table and start coalescing subsequent inbound packets.

When the IP layer delivers inbound TCP packets to the LRO layer, the LRO layer performs the TCP checksum validation on each packet. According to one embodiment, the LRO layer marks a field associated with the packet (e.g., a field in the mbuf carrying the packet in the BSD environment) to indicate that it has completed checksum validation. This allows the TCP layer to skip the checksum process when the packet reaches the TCP layer. The LRO layer then performs a lookup in the flow table for a matching flow entry, for example, based on a hash of certain TCP/IP header information (e.g., source/destination IP addresses/ports). If no flow entry is found, the packet is immediately delivered to the TCP layer. If a flow entry is found, the LRO layer runs the packet through several examinations to determine if there is any exception to the coalescing. Once all examinations are passed, the packet is placed in RSC queue 203 associated with the flow entry. RSC timer 510 is started. RSC timer 510 ensures that if the single or coalesced packet is not delivered to the TCP layer within the stipulated time for any other reason, the firing of the timer will force the packet to be immediately delivered to the TCP layer.

When subsequent in-sequence packets arrive for this flow, according to one embodiment, they are linked with the first TCP packet in the queue 203, forming coalesced packet 502. Certain pointers are manipulated so that the TCP header of the first packet becomes the TCP header of the coalesced packet. Only data parts (e.g., payload) of other packets are linked with the first packet, such that the data blobs are linked together in a data linked list. In one embodiment, TCP coalescing is performed only if the packet contains TCP timestamp options. TCP timestamps 505 allow the TCP layer accurately to measure round trip time (RTT). RTT measurement is used to calculate retransmit timeout values. When packets are coalesced, the TCP layer loses a packet based on packet RTT information in the case where the TCP timestamp option is absent. Hence, the LRO layer skips the RSC processing entirely when the TCP timestamp option is missing. If any of the TCP flags other than the ACK flag are set, according to one embodiment, the LRO layer stops coalescing. Further, if any of the TCP options other than the TCP Timestamp option is set, the LRO layer stops coalescing. Whenever the coalescing is stopped, all the packets currently coalesced thus far are delivered as one coalesced packet to the TCP layer, followed by the exception packet (e.g., current incoming packet).

If none of the above exceptions occurs, but the LRO layer completely coalesces up to a predetermined number of packets, according to one embodiment, the LRO layer delivers the coalesced packet up to the TCP layer at this point after updating the next expected sequence number in its flow entry state. In addition, for any coalesced packets, the LRO layer indicates to the TCP layer that this is a coalesced packet having multiple TCP packets coalesced therein, as well as the number of packets coalesced therein.

According to another embodiment, the TCP layer tries to estimate the idleness of the remote side. If the TCP layer detects that the inter packet arrival time between two consecutive packets matches or exceeds its estimate of the retransmission timeout, according to one embodiment, the TCP layer calls into the LRO layer to eject the flow at the next available opportunity. When the LRO layer receives a next packet, or its timer fires, the LRO layer removes all state of the flow and delivers any pending coalesced packets in its queue to the TCP layer. When the TCP layer receives out-of-order packets, according to one embodiment, the TCP layer instructs the LRO layer to eject the flow at the next available opportunity. When the LRO layer receives the next packet, or its timer fires, the LRO layer removes all state of the flow and delivers any pending coalesced packets in its queue to the TCP layer.

When the TCP layer receives a coalesced packet, the TCP layer updates the stat information to reflect the actual number of packets received from the network. If the coalesced size is more than two network segments, the TCP layer sets up state in a TCP connection data structure to send multiple ACKs instead of just one for one coalesced segment or one for every other coalesced segment. The TCP layer also ensures that the default stretch ACK behavior (ACKing every eight packets after the connection has continued to send/receive a large number of bytes, instead of ACKing every other packet) is retained even with LRO in play.

Figure 6:
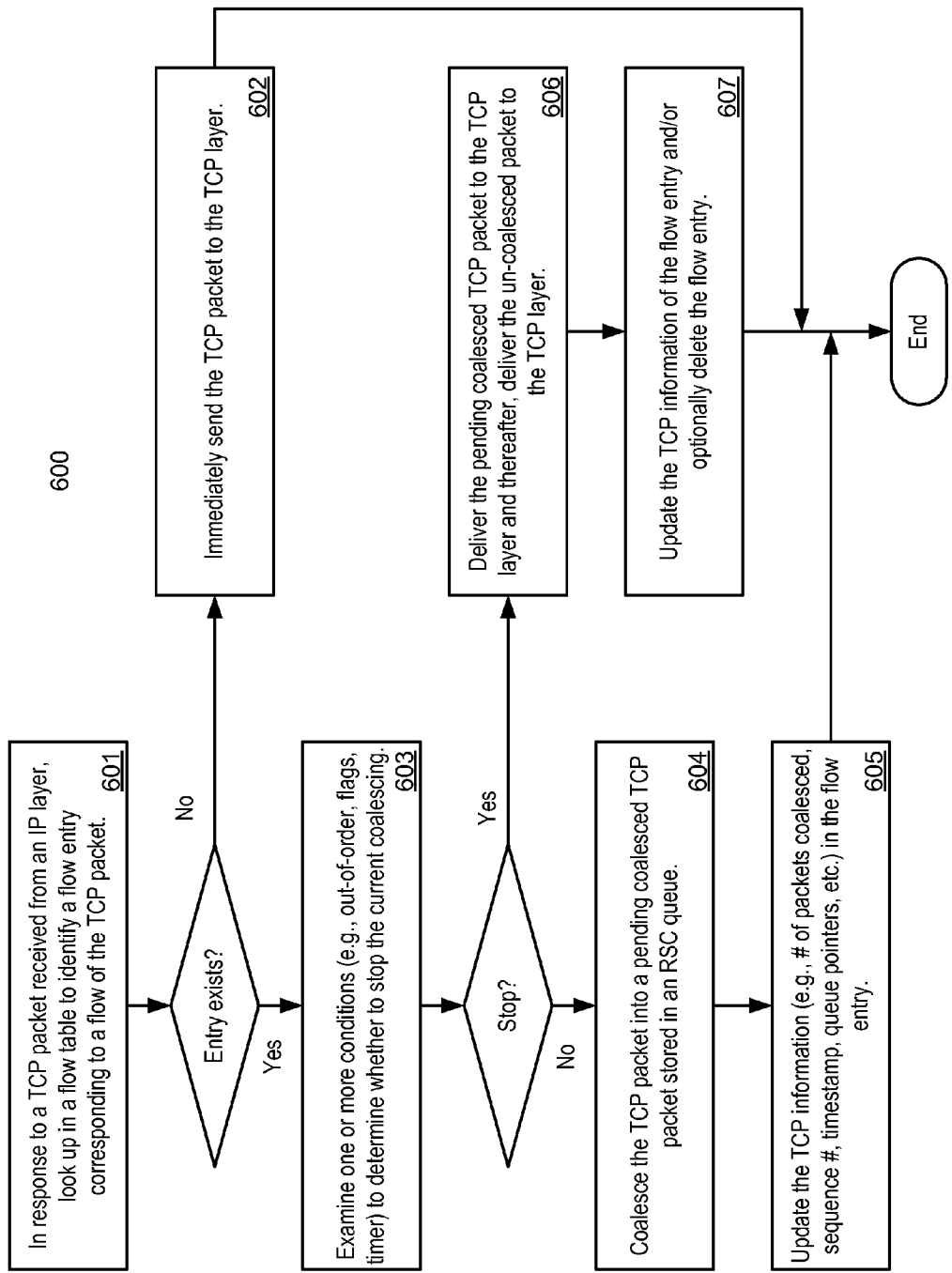
FIG. 6 is a flow diagram illustrating a method for RSC processing according to one embodiment of the invention.

FIG. 6 is a flow diagram illustrating a method for RSC processing according to one embodiment of the invention. Method 600 may be performed by processing logic such as by LRO layer 109 and/or TCP layer 201 of FIG. 2. Referring to FIG. 6, in response to a TCP packet received from an IP layer, processing logic looks up in a RSC flow table to identify a flow entry corresponding to a flow associated with the packet. The flow of the packet may be identified by hashing certain TCP/IP header information such as the source/destination IP addresses/ports. If there is no existing flow entry associated with the flow of the incoming packet (e.g., the flow is not currently coalesced), at block 602, the packet is immediately sent to the TCP layer without coalescing.

If there is an existing flow entry associated with the flow of the incoming packet (e.g., the flow is currently being coalesced), at block 603, processing logic examines one or more conditions (e.g., out-of-order packet, flags, expired timer, number of packets coalesced exceeds a certain level) to determine whether the current coalescing session should be stopped. If so, at block 606, the currently pending coalesced packet, as well as the incoming packet, is delivered to the TCP layer and the TCP information in the flow table entry is updated accordingly at block 607. If the current coalescing session should not be stopped, at block 604, the incoming TCP packet is coalesced into the pending coalesced packet or treated as a new coalesced packet of a new coalescing session and stored in the corresponding RSC queue. At block 605, the TCP information (e.g., number of packets coalesced, sequence number, timestamp, queue pointer, etc.) is updated in the flow table entry.

Figure 7A:
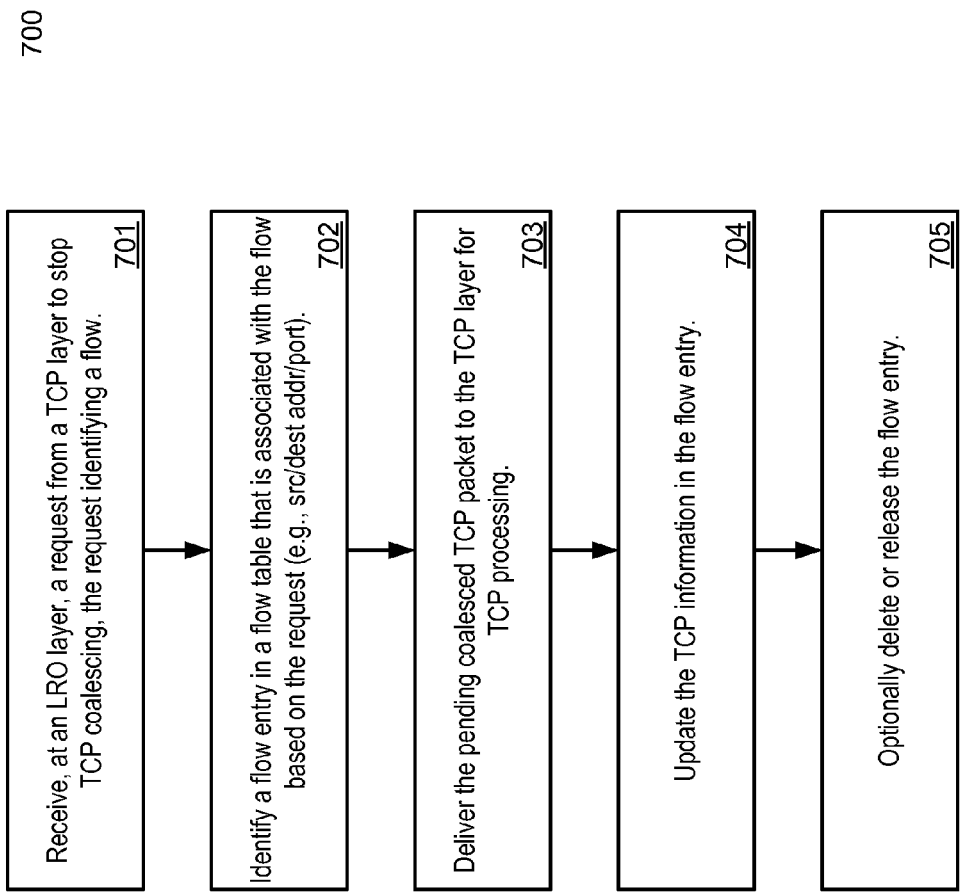
FIGS. 7A and 7B are flow diagrams illustrating a method for RSC processing according to certain embodiments of the invention.

FIG. 7A is a flow diagram illustrating a method for RSC processing according to another embodiment of the invention. Method 700 may be performed by processing logic such as by LRO layer 109 and/or TCP layer 201 of FIG. 2. Referring to FIG. 7A, an LRO layer receives a request from a TCP layer to stop TCP coalescing, where the request identifies a flow. At block 702, processing logic identifies a flow entry in a flow table that is associated with the flow based on the request (e.g., source/destination addresses/ports). At block 703, the currently pending coalesced packet is delivered to the TCP layer for TCP processing. At block 704, the flow table entry is updated accordingly and optionally, the flow table entry may be deallocated or removed at block 705.

Figure 7B:
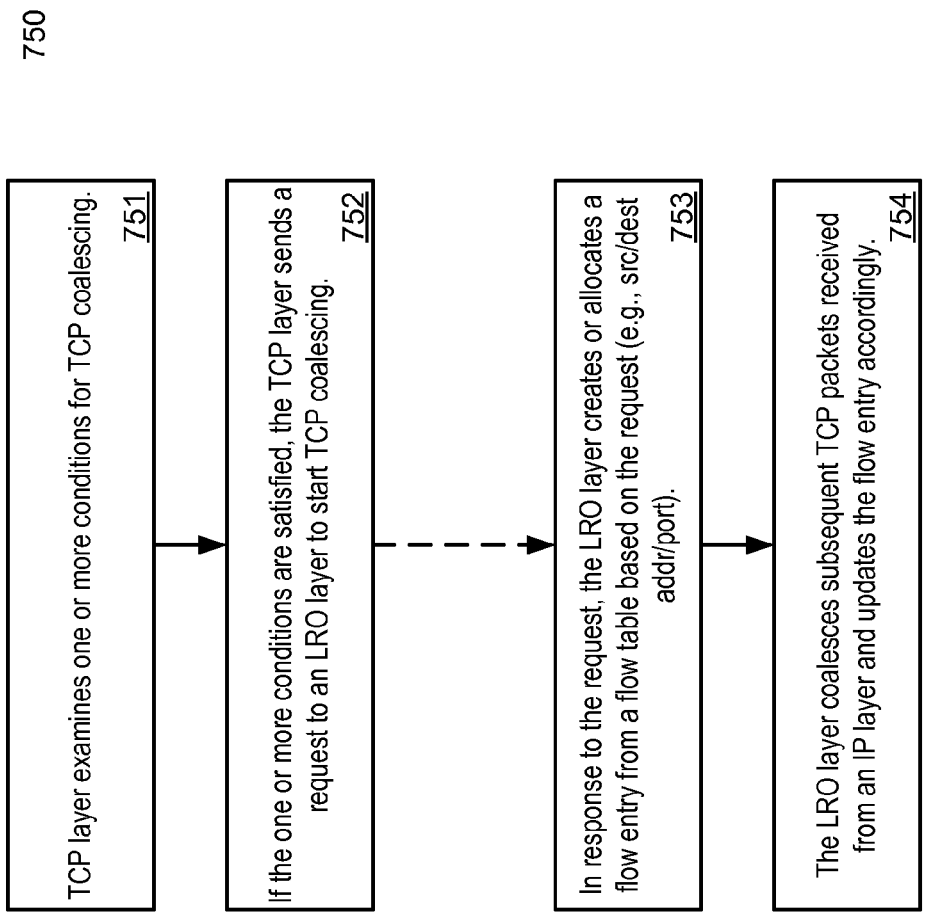

FIG. 7B is a flow diagram illustrating a method for RSC processing according to another embodiment of the invention. Method 750 may be performed by processing logic such as by LRO layer 109 and/or TCP layer 201 of FIG. 2. Referring to FIG. 7B, at block 751, a TCP layer examines one or more conditions for TCP coalescing, such as, number of in-order packets received, etc. If one or more conditions are satisfied, at block 752, the TCP layer sends a request to a LRO layer to start TCP coalescing. In response to the request, at block 753, the LRO layer creates or allocates a flow table entry from a flow table based on the request (e.g., source/destination IP addresses/ports). At block 754, the LRO layer starts coalescing subsequent TCP packets received from an IP layer and updates the flow table entry accordingly.

Figure 8:
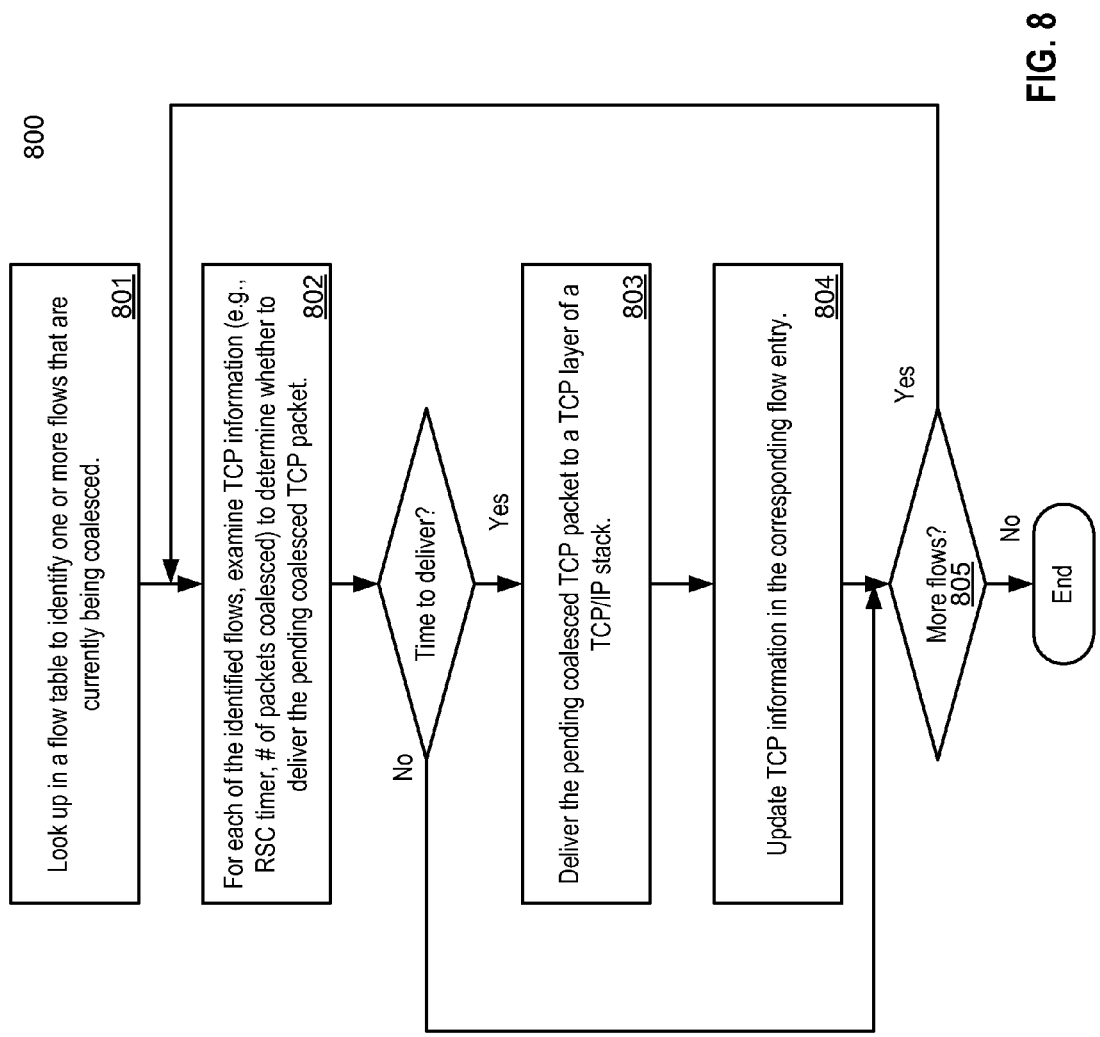
FIG. 8 is a flow diagram illustrating a method for RSC processing according to another embodiment of the invention.

FIG. 8 is a flow diagram illustrating a method for RSC processing according to another embodiment of the invention. Method 800 may be performed by processing logic such as by LRO layer 109 and/or TCP layer 201 of FIG. 2. For example, method 800 may be performed as part of maintenance thread to deliver certain coalesced packets that have been queued for a while. Referring to FIG. 8, at block 801, processing logic looks up in a flow table to identify one or more flows that are currently being coalesced. At block 802, for each of the identified flows, processing logic examines the TCP information, such as RSC timer and/or number of packets currently being coalesced, to determine whether it is time to deliver the pending coalesced packet. If so, at block 803, the pending coalesced packet is delivered to a TCP layer of a TCP/IP stack and at block 804, the corresponding flow entry is updated accordingly.

Figure 9:
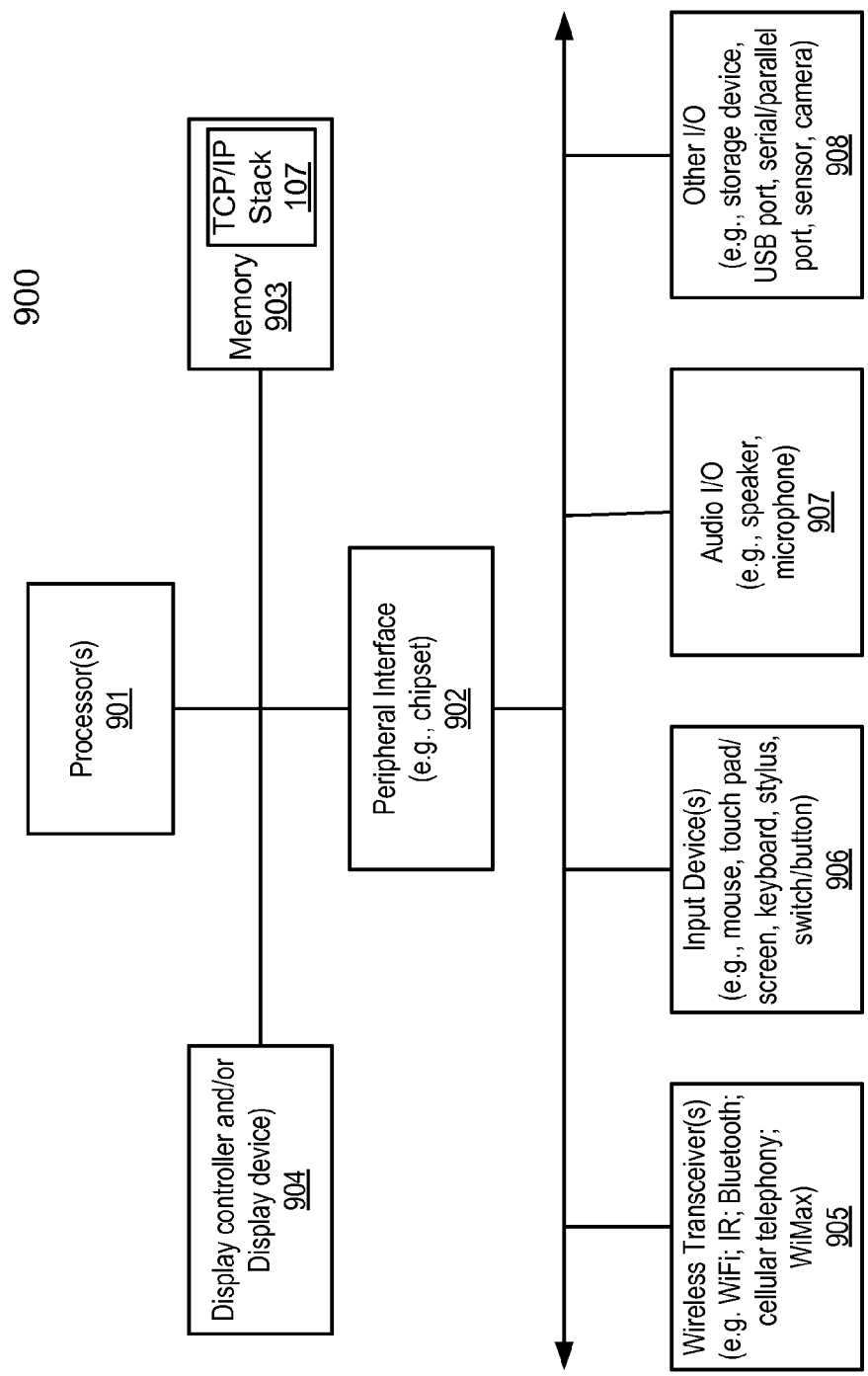
FIG. 9 is a block diagram illustrating an example of a data processing system which may be used with one embodiment of the invention.

FIG. 9 is a block diagram illustrating an example of a data processing system which may be used with one embodiment of the invention. For example, system 900 may represents any of data processing systems (e.g., system 100 of FIG. 1) described above performing any of the processes or methods described above. System 900 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof.

Referring to FIG. 9, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with a graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 902 may provide an interface to IO devices such as devices 905-908, including wireless transceiver(s) 905, input device(s) 906, audio IO device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 9 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
in response to a transport control protocol (TCP) packet received from an Internet protocol (IP) layer of a TCP/IP stack of a data processing system:
identifying, by a large receive offload (LRO) layer between the IP layer and a TCP layer of the TCP/IP stack, a flow associated with the TCP packet;
receiving, at the LRO layer, instructions or feedback from the TCP layer;
determining whether or how the identified flow should be coalesced based on a set of one or more rules and the instructions or feedback from the TCP layer;
coalescing, by the LRO layer, the TCP packet into a pending coalesced TCP packet without immediately sending the TCP packet to the TCP layer of the TCP/IP stack, if it is determined that the identified flow should be coalesced based on the set of one or more rules; and
otherwise immediately sending, by the LRO layer, the TCP packet to the TCP layer for TCP processing.

2. The method of claim 1, further comprising:
examining one or more conditions associated with the identified flow and the pending coalesced TCP packet to determine whether the pending coalesced TCP packet should be delivered; and
delivering the pending coalesced TCP packet to the TCP layer if the one or more conditions are satisfied.

3. The method of claim 2, wherein examining one or more conditions comprises determining a number of TCP packets that have been packed into the pending coalesced TCP packet, wherein the pending coalesced TCP packet is delivered to the TCP layer if the number of TCP packets packed in the pending coalesced TCP packet exceeds a predetermined threshold.

4. The method of claim 2, wherein examining one or more conditions comprises determining whether the pending coalesced TCP packet has been pending for a predetermined period of time, wherein the pending coalesced TCP packet is delivered to the TCP layer if the pending coalesced TCP packet has been pending for a predetermined period of time.

5. The method of claim 2, wherein examining one or more conditions comprises determining whether the TCP packet received from the IP layer is an out-of-order packet or whether at least one predetermined flag has been set in the TCP packet, wherein the pending coalesced TCP packet is delivered to the TCP layer if the TCP packet is an out-of-order packet or at least one predetermined flag has been set in the TCP packet.

6. The method of claim 5, wherein the at least one predetermined flag includes at least one of SYN, FIN, RST, ECE, and PSH flags.

7. The method of claim 5, further comprising stopping TCP coalescing if the TCP packet is an out-of-order packet or at least one predetermined flag has been set in the TCP packet, wherein a subsequent TCP packet received from the IP layer is immediately sent to the TCP layer without coalescing.

8. The method of claim 7, further comprising:
receiving, at the LRO layer, a request to start TCP coalescing from the TCP layer; and
restarting, by the LRO layer, the TCP coalescing by coalescing subsequent TCP packets received from the IP layer.

9. A non-transitory computer-readable storage medium having instructions stored therein, which when executed by a computer, cause the computer to perform a operations comprising:
in response to a transport control protocol (TCP) packet received from an Internet protocol (IP) layer of a TCP/IP stack of a data processing system, identifying, by a large receive offload (LRO) layer between the IP layer and a TCP layer of the TCP/IP stack, a flow associated with the TCP packet;
receiving, at the LRO layer, instructions or feedback from the TCP layer;
determining whether or how the identified flow should be coalesced based on a set of one or more rules and the instructions or feedback from the TCP layer;
coalescing, by the LRO layer, the TCP packet into a pending coalesced TCP packet without immediately sending the TCP packet to the TCP layer of the TCP/IP stack, if it is determined that the identified flow should be coalesced based on the set of one or more rules; and
otherwise immediately sending, by the LRO layer, the TCP packet to the TCP layer for TCP processing.

10. The non-transitory computer-readable storage medium of claim 9, wherein the method further comprises:
examining one or more conditions associated with the identified flow and the pending coalesced TCP packet to determine whether the pending coalesced TCP packet should be delivered; and
delivering the pending coalesced TCP packet to the TCP layer if the one or more conditions are satisfied.

11. The non-transitory computer-readable storage medium of claim 10, wherein examining one or more conditions comprises determining a number of TCP packets that have been packed into the pending coalesced TCP packet, wherein the pending coalesced TCP packet is delivered to the TCP layer if the number of TCP packets packed in the pending coalesced TCP packet exceeds a predetermined threshold.

12. The non-transitory computer-readable storage medium of claim 10, wherein examining one or more conditions comprises determining whether the pending coalesced TCP packet has been pending for a predetermined period of time, wherein the pending coalesced TCP packet is delivered to the TCP layer if the pending coalesced TCP packet has been pending for a predetermined period of time.

13. The non-transitory computer-readable storage medium of claim 10, wherein examining one or more conditions comprises determining whether the TCP packet received from the IP layer is an out-of-order packet or whether at least one predetermined flag has been set in the TCP packet, wherein the pending coalesced TCP packet is delivered to the TCP layer if the TCP packet is an out-of-order packet or at least one predetermined flag has been set in the TCP packet.

14. The non-transitory computer-readable storage medium of claim 13, wherein the at least one predetermined flag includes at least one of SYN, FIN, RST, ECE, and PSH flags.

15. The non-transitory computer-readable storage medium of claim 13, wherein the method further comprises stopping TCP coalescing if the TCP packet is an out-of-order packet or at least one predetermined flag has been set in the TCP packet, wherein a subsequent TCP packet received from the IP layer is immediately sent to the TCP layer without coalescing.

16. The non-transitory computer-readable storage medium of claim 15, wherein the method further comprises:
receiving, at the LRO layer, a request to start TCP coalescing from the TCP layer; and
restarting, by the LRO layer, the TCP coalescing by coalescing subsequent TCP packets received from the IP layer.

17. A data processing system, comprising:
a processor; and
a memory coupled to the processor, the memory having a transport control protocol (TCP)/Internet protocol (IP) stack executed therein by the processor, wherein the TCP/IP stack includes an IP layer for IP processing, a TCP layer for TCP processing, a large receive offload (LRO) layer between the IP layer and the TCP layer and a two-way communications path maintained between the LRO layer and the TCP layer, the LRO layer configured to:

in response to a transport control protocol (TCP) packet received from the IP layer of a TCP/IP stack, identify a flow associated with the TCP packet, receive at the LRO layer, instructions or feedback from the TCP layer, determine whether or how the identified flow should be coalesced based on a set of one or more rules and the instructions or feedback from the TCP layer, coalesce the TCP packet into a pending coalesced TCP packet without immediately sending the TCP packet to the TCP layer of the TCP/IP stack, if it is determined that the identified flow should be coalesced based on the set of one or more rules, and otherwise immediately send the TCP packet to the TCP layer for TCP processing.

18. The system of claim 17, wherein the LRO layer further performs following operations:

examining one or more conditions associated with the identified flow and the pending coalesced TCP packet to determine whether the pending coalesced TCP packet should be delivered; and delivering the pending coalesced TCP packet to the TCP layer if the one or more conditions are satisfied.

19. The system of claim 18, wherein examining one or more conditions comprises determining a number of TCP packets that have been packed into the pending coalesced TCP packet, wherein the pending coalesced TCP packet is delivered to the TCP layer if the number of TCP packets packed in the pending coalesced TCP packet exceeds a predetermined threshold.

20. The system of claim 18, wherein examining one or more conditions comprises determining whether the pending coalesced TCP packet has been pending for a predetermined period of time, wherein the pending coalesced TCP packet is delivered to the TCP layer if the pending coalesced TCP packet has been pending for a predetermined period of time.

21. The system of claim 18, wherein examining one or more conditions comprises determining whether the TCP packet received from the IP layer is an out-of-order packet or whether at least one predetermined flag has been set in the TCP packet, wherein the pending coalesced TCP packet is delivered to the TCP layer if the TCP packet is an out-of-order packet or at least one predetermined flag has been set in the TCP packet.

22. The system of claim 21, wherein the at least one predetermined flag includes at least one of SYN, FIN, RST, ECE, and PSH flags.

23. The system of claim 21, wherein the LRO layer further stops TCP coalescing if the TCP packet is an out-of-order packet or at least one predetermined flag has been set in the TCP packet, wherein a subsequent TCP packet received from the IP layer is immediately sent to the TCP layer without coalescing.

24. The system of claim 23, wherein the LRO layer further performs following operations:

receiving a request to start TCP coalescing from the TCP layer; and restarting the TCP coalescing by coalescing subsequent TCP packets received from the IP layer.

\* \* \* \* \*

UNITED STATES PATENT AND TRADEMARK OFFICE
CERTIFICATE OF CORRECTION

| | | |
|---|---|---|
| PATENT NO. | : 8,996,718 B2 | Page 1 of 1 |
| APPLICATION NO. | : 13/364585 | |
| DATED | : March 31, 2015 | |
| INVENTOR(S) | : Anumita Biswas | |

It is certified that error appears in the above-identified patent and that said Letters Patent is hereby corrected as shown below:

In the Claims

Column 13, Line 64 at Claim 9; replace:
"computer, cause the computer to perform a operations com-" with
-- computer, cause the computer to perform operations com- --

Signed and Sealed this
Eighteenth Day of August, 2015

Michelle K. Lee
*Director of the United States Patent and Trademark Office*